July 11, 1961
F. A. McNIEL
2,992,418
AUTOMOTIVE DECELERATION WARNING MECHANISM
Filed Sept. 6, 1957
3 Sheets-Sheet 1
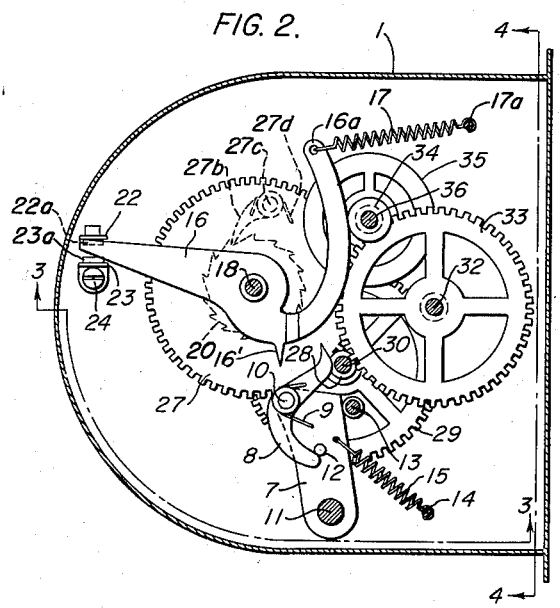
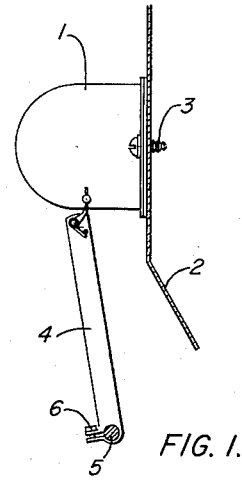
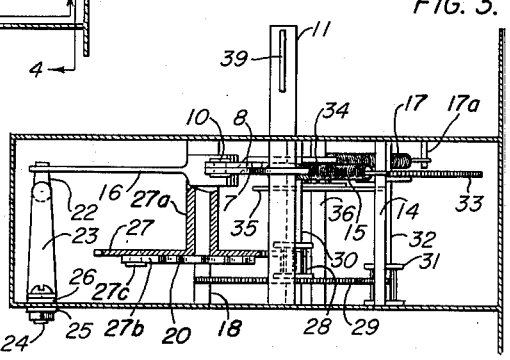
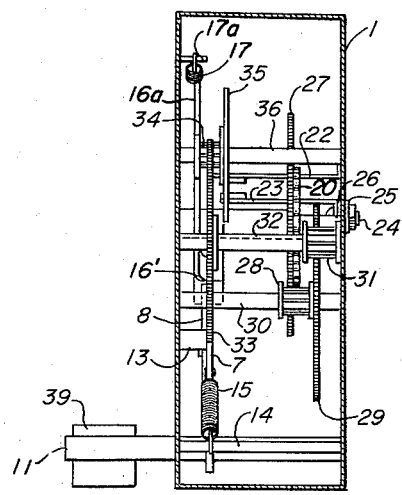
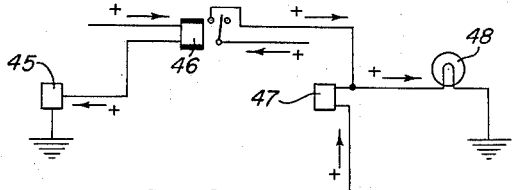
INVENTOR.
FRED A. McNIEL
BY
*Beale and Jones*

July 11, 1961

F. A. McNIEL 2,992,418

AUTOMOTIVE DECELERATION WARNING MECHANISM

Filed Sept. 6, 1957

INVENTOR.
FRED A. McNIEL
BY
*Beale and Jones*

July 11, 1961 F. A. McNIEL 2,992,418
AUTOMOTIVE DECELERATION WARNING MECHANISM
Filed Sept. 6, 1957 3 Sheets-Sheet 3

← DECELERATE ACCELERATE →

INVENTOR
FRED A. McNIEL

BY Beale and Jones

ATTORNEY

United States Patent Office 2,992,418
Patented July 11, 1961

2,992,418
AUTOMOTIVE DECELERATION WARNING MECHANISM
Fred A. McNiel, 611 Bouldin, Austin, Tex., assignor of one-half to C. B. Smith, Austin, Tex.
Filed Sept. 6, 1957, Ser. No. 682,431
5 Claims. (Cl. 340—262)

This invention relates to a deceleration warning mechanism for use in combination with motor vehicles and more particularly, to a deceleration warning mechanism of the accelerator actuated type.

Many of today's highway collisions in which one vehicle collides with the rear of another are caused by the length of driver reaction time between the time he becomes aware of either the stop lights of the preceding vehicle or sees that the vehicle itself is decelerating.

With respect to the viewing of brake lights of preceding vehicles, there is an interval between the time the driver of the preceding vehicle removes his foot from the accelerator and the time at which he applies the brakes of the vehicle. If a device were available which would operate a visible signal such as the brake lights as the driver removes his foot from the accelerator the loss of time caused by the reaction of the driver of a following vehicle would be greatly compensated for.

In the case in which the preceding vehicle is merely decelerating, without application of the brakes and therefor with no visible signal indicating the state of deceleration, the reaction time of the driver of the following vehicle depends upon his perception of distance and may be lengthened considerably as a result.

In the prior art, several systems have been devised for providing accelerator actuated indicators for vehicles to convey to the driver of a following vehicle that the vehicle preceding him is decelerating.

Several disadvantages have been predominant in these devices. One major disadvantage has been the fact that most of the accelerator operated signals will remain on as long as the accelerator is in a rest position. This is unnecessary and provides false indication when the vehicle is sitting still or coasting down steep grades.

Devices have been developed which actuate a signal light when the accelerator is returned to rest position and extinguish the light after a predetermined period of time. The devices have been unreliable from a maintenance standpoint or are difficult to incorporate into the makeup of the vehicle.

My invention provides an accelerator operated device of the above described type having a signal timing mechanism which is reliable in operation, easy to install in a motor vehicle and reasonable in cost.

It is an object of this invention to provide an accelerator actuated vehicle deceleration signal having a reliable operating mechanism.

Another object of this invention is to provide a deceleration signal having a definite timed interval of operation.

Still another object of this invention is to provide a signal operating mechanism of the inertia controlled clock train type.

Still another object of this invention is to provide a signal operating mechanism which is readily installed with respect to the accelerator linkage of a motor vehicle.

These and other objects of my invention will become apparent from the following specification and drawings. It is to be understood that the invention is not limited by the specific embodiments shown in that many modifications could be made within a scope of this invention.

In the drawings:

FIG. 1 is a side view of the invention as mounted on the firewall and accelerator linkage of a motor vehicle.

FIG. 2 is a side elevation on an enlarged scale of one embodiment of the signal timing mechanism.

FIG. 3 is a cross-section taken on line 3—3 of FIG. 2.

FIG. 4 is a cross-section taken on line 4—4 of FIG. 2.

FIG. 9 is a circuit diagram of the signal system.

Figure 5:
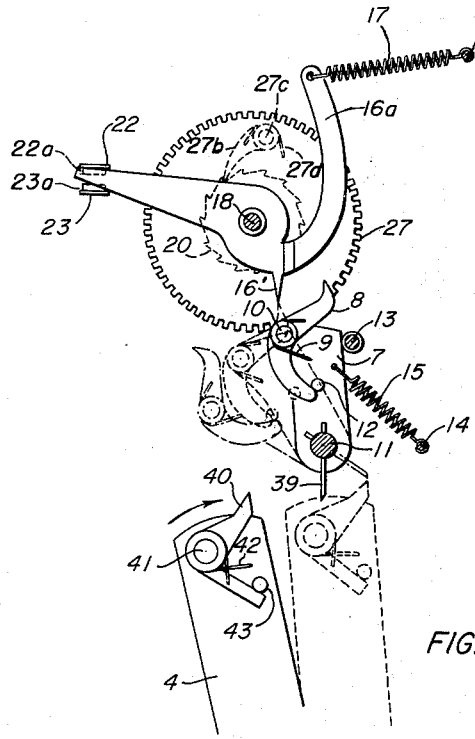
FIG. 5 is a detail view of the timer actuating mechanism of FIG. 2.
Figure 6:
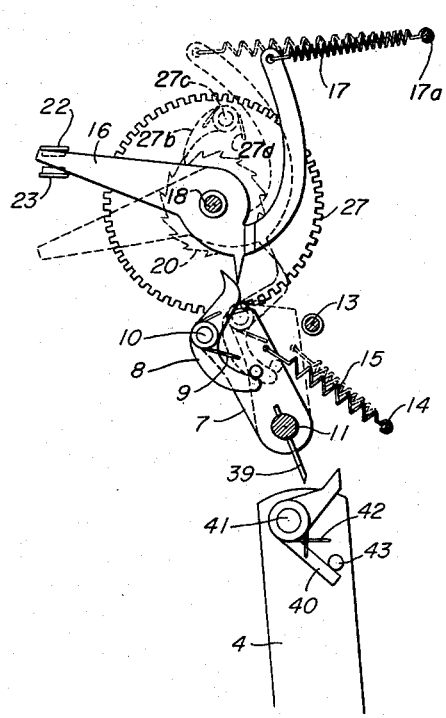
FIG. 6 is a detail view showing another stage of operation of the mechanism in FIG. 5.
Figure 7:
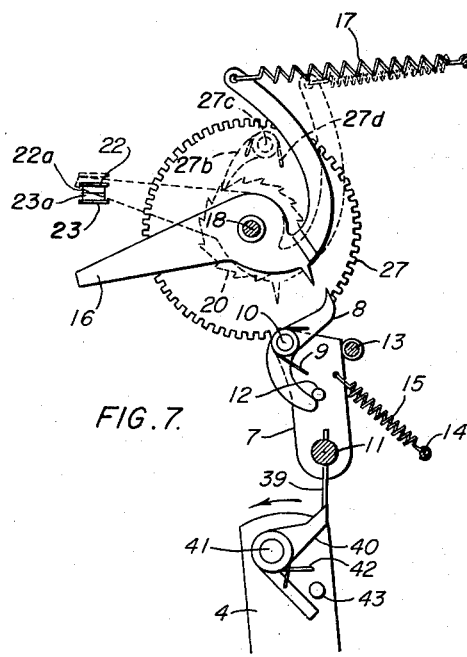
FIG. 7 is a continuation of the cycle of operation in FIGS. 5 and 6.
Figure 8:
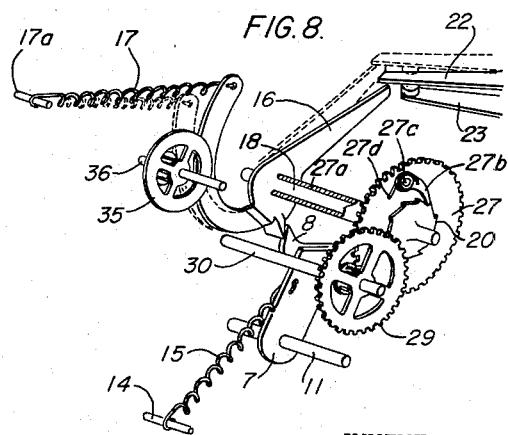
FIG. 8 is a perspective rear view of the mechanism shown in FIG. 5.

Referring to the drawings, FIG. 1 shows the signal timing mechanism enclosed in a casing 1 and fastened to the firewall 2 of a motor vehicle by screws 3. A timing mechanism actuating arm 4 is connected to the accelerator linkage 5 of the vehicle by a locking screw 6. The timing mechanism actuating arm 4 is adapted to swing through the same angle as the accelerator linkage of the vehicle and is so adjusted as to actuate the signal timing mechanism when the accelerator of the vehicle is moved from a depressed position to a position in which the motor is substantially deenergized to idling speed.

Referring to FIGS. 2, 3 and 4 inclusive, for the purpose of clarity, a trigger arm 7 is provided for the timing mechanism shown. Mounted on the trigger arm 7 is a one-way pawl 8 biased by a spring 9 about a pivot 10 into contacting position with a stop pin 12. The trigger arm 7 is spring biased to pivot with a shaft 11 into engagement with a stop pin 13 through a spring 15 stretched between a point on the trigger arm and an anchoring screw 14.

The above described lever arrangement based around the trigger arm 7 cooperates with a contact actuating arm 16 through the outer tip of one-way pawl 8 and a downwardly extending detent 16' on the contact actuating arm 16.

Arm 16 is keyed to rotate shaft 18 and ratchet wheel 20 which is also keyed to the shaft 18.

Arm 16 is extended to form a lever 16a through which a spring 17 anchored at a point 17a provides the driving force for the timing mechanism once it has been triggered.

A pair of contact arms 22 and 23 having a pair of contacts 22a and 23a respectively, are normally spring biased together by the spring force in the contact arm 22. The contact actuating arm 16 cooperates with the upper contact arm 22 to either separate the contacts 22a and 23a or allow them to close. A screw 24 and insulating washers 25 and 26 are used to connect the contacts into a suitable electrical signal circuit. A main driving gear 27 is mounted on the shaft 18 intermediate to and coaxial with the contact actuating arm 16 and ratchet wheel 20 and is free to rotate on the shaft by means of an integral bearing sleeve 27a. The gear 27 is immediately adjacent the ratchet wheel 20 and carries an indexing pawl 27b pivoted at 27c and spring biased into contact with the ratchet wheel 20 by a spring 27d.

Main drive gear 27 is connected to drive integral gears 28 and 29 mounted for rotation on fixed shaft 30. Gear 29 in turn drives a gear 31 which is keyed to shaft 32 to impart rotation thereto.

At the opposite end of the shaft 32 is mounted a flywheel driving gear 33 which is keyed to the shaft 32 for rotation therewith. A gear 34 integral with a flywheel 35 is driven by the flywheel driving gear 33 and hence the flywheel 35 is rotated. A shaft 36 is provided for mounting the flywheel and integral gear unit.

In order that the timing mechanism may be triggered by the actuating arm 4 on the accelerator linkage and the trigger arm 7 (see FIG. 5), a timing mechanism actuating arm follower 39 is combined with the shaft 11 with which the trigger arm 7 rotates. The actuating arm follower 39 acts as a lever arm to transmit the force from the actuating arm 4 to the trigger arm 7 by imparting rotation to the shaft 11. A one-way pawl 40 is mounted on the actuating arm 4 by a pivot pin 41 to cooperate with the actuating arm follower 39 on the trigger arm shaft 11. A spring 42 is provided at the pivot 41 to bias the one-way pawl 40 into contact with a stop pin 43.

Referring to FIG. 9, the timing mechanism and switch 22—23 are generally indicated at 45. When the contacts 22a and 23a are closed the relay 46 is energized and actuates the signal light 48 for as long as the contacts 22a and 23a remain closed. The duration of the signal is determined by the inertia and friction in the gear train of the timing mechanism which determines the time lag present between the initial closing of contacts 22a and 23a and the reopening thereof by the actuating arm 16. A conventional brake operated switch 47 is included in the circuit to actuate the signal light 48 in response to the operation of the brakes of the motor vehicle.

MODIFICATION—FIG. 10

Figure 10:
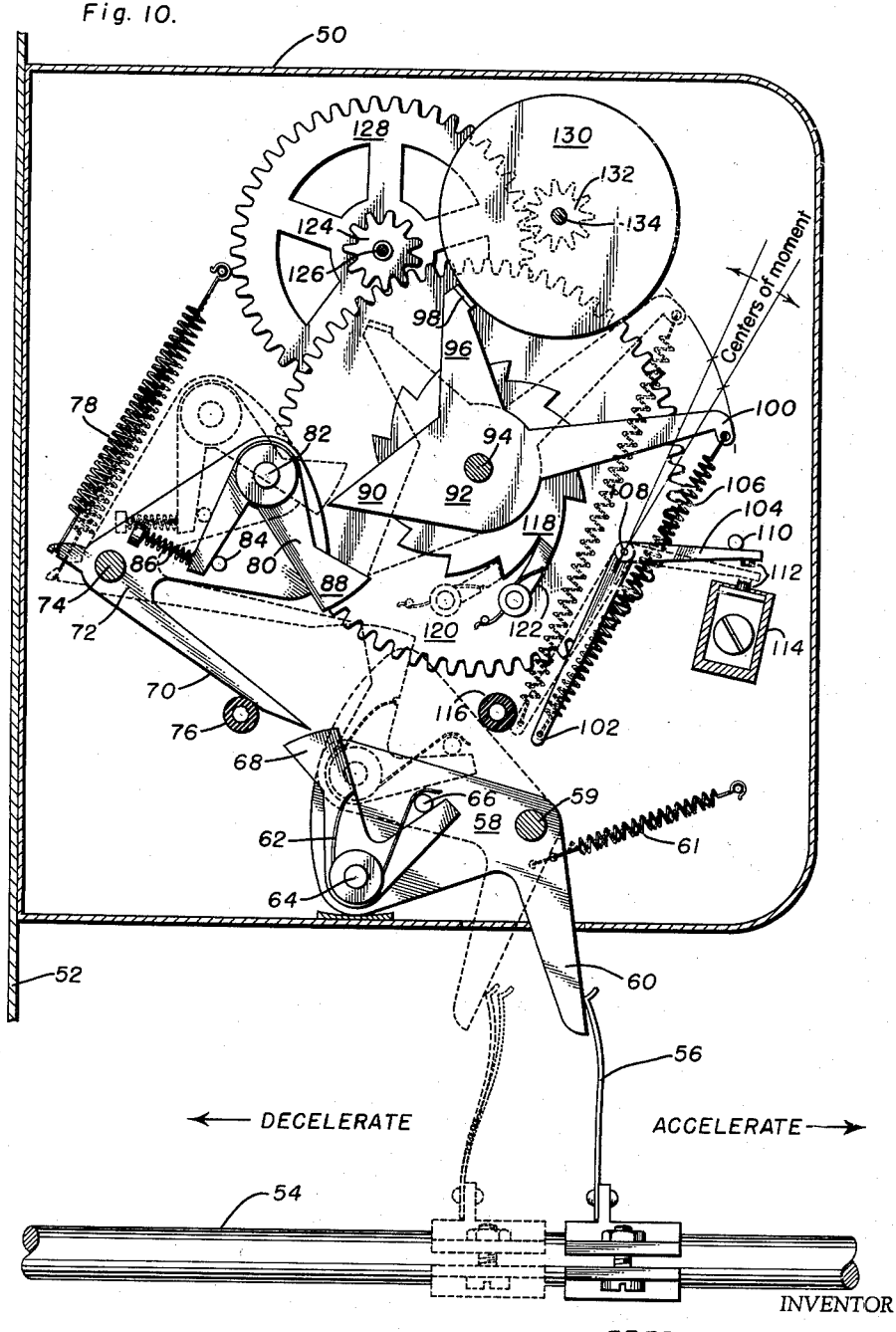
FIG. 10 is a modification on an enlarged scale of the mechanism shown in FIG. 2.

A modification of my invention is shown in FIG. 10. An outer case 50 is shown mounted on the firewall 52 of a motor vehicle.

Mounted on the accelerator linkage push rod 54 is a resilient timing mechanism actuating arm 56 which engages a first rocker arm 58 pivoted at 59 and having a depending tip 60 hanging below the bottom of the outer casing 50. A biasing spring 61 is provided to hold the first rocker arm 58 in an initial rest position.

Mounted on the first rocker arm 58 is a one-way actuating linkage 62 having a pivot 64 and stop pin 66 for effecting the one-way action thereof.

One-way actuating linkage 62 is provided with an extended force transferring tip 68 which is so disposed as to come into contact with the depending lever arm 70 of a second rocker arm assembly 72 which is pivoted about an axis 74. A stop post 76 is provided to act in conjunction with a relatively strong biasing spring 78 to hold the second rocker arm assembly 72 in a rest position.

A second one-way actuating linkage 80 is pivotally mounted on the second rocker arm assembly 72 to pivot about axis 82. A stop pin 84 and small biasing spring 86 are provided to hold the second one-way actuating linkage 80 in the desired initial position. The force transferring tip 88 of the linkage 80 is adapted to contact an extended lever 90 on the main rocker arm assembly 92. The main rocker arm 92 is pivotally mounted about an axis 94 and has, in addition to the extended lever 90, a braking arm 96 having a brake shoe 98 thereon and an electric switch actuating lever 100. The actuating lever 100 is connected in an over center relationship with the lower end 102 of an angular contact make and break arm 104 through an actuating force transferring drive spring 106. The contact make and break arm 104 is pivoted at 108 and provided with a stop pin 110 whereby it is held in the correct position to open and close the contacts 112 of the warning light control switch 114. A second stop pin 116 is provided to limit the travel of the lower tip 102 of the contact make and break arm 104.

Ratchet wheel 118 is so fixed as to oscillate about the shaft 94 with the main rocker arm assembly 92. The ratchet wheel 118 cooperates with main drive gear 120 through a spring biased pawl member 122.

The main drive gear 120 is mounted for free rotation about the shaft 94 and engages a second gear member 124 which is rotatable with shaft 126. Fixed to shaft 126 so as to follow the rotation of the gear member 124 is a fourth gear 128.

The fourth gear member 128 is in driving connection with a flywheel 130 which oscillates with its drive connecting gear 132 about common shaft 134. It is shown that the periphery of the flywheel 130 is in contact with the brake shoe 98 on the brake arm 96 of the main rocker arm 92 at certain specific positions of the main rocker arm.

OPERATION—FIGS. 1–8

Referring to FIGS. 1 through 8, the operation shown therein is as follows:

When the driver's foot is removed from the accelerator pedal, the movement of the pedal linkage swings actuating arm 4 and brings one-way pawl 40 into engagement with the actuating arm follower 39 whereby the shaft 11 is rotated. Rotation of the shaft 11 causes the trigger arm 7 to swing in the opposite direction from the actuating arm follower 39 and cause the one-way pawl 8 mounted thereon to slip past the downwardly extending detent 16' on the contact actuating arm 16. This movement places spring 15 in tension and tends to return the trigger arm 7 and one-way pawl 8 to their original position of rest against the stop 13. As the one-way pawl 8 returns it presses against the downwardly extending detent 16' and causes rotation of the contact actuating arm 16 and the ratchet wheel 20 which are both keyed to a common shaft 18. This rotation closes switch contacts 22a and 23a through contact arms 22 and 23, respectively.

As the contacts 22a and 23a are closed, spring 17 is placed in tension by lever 16a on the contact actuating arm 16. Also, when the ratchet wheel 20 is rotated, pawl 27b mounted on the main driving gear 27 is slipped to a new position of engagement with the ratchet wheel 20 and thereby transfers the driving force of the spring 17 to the main driving gear 27.

At this point in the operation the timing mechanism is fully cocked and ready to unwind. The unwinding or return cycle is accomplished by the cooperation between main drive gear 27 and the gear train comprising integral gears 28 and 29, shaft 30, gear 31, shaft 32, flywheel driving gear 33 and the combination gear and flywheel 34 and 35, respectively. The inertia of the system determines the time necessary for the system to return to rest position. As the reverse rotation necessary for unwinding is applied the contact actuating arm 16 is returned to its initial position whereby the contacts 22 and 23a are separated, the signal lights being deenergized by the circuit of FIG. 9 as previously described.

OPERATION—MODIFICATION—FIG. 10

The operation of the modification shown in FIG. 10 is more complex than that described above and utilizes a snap acting switch as opposed to the slower acting type shown in FIGS. 1 to 8.

As the accelerator linkage push rod 54 moves in the direction indicated for vehicle deceleration the resilient actuating arm 56 moves from the solid line position through the dotted line position shown to actuate the first rocker arm 58 through contact with the depending tip 60 thereon. As the rocker arm 58 is swung from the solid line to the dotted line position shown, one-way actuating linkage 62 depending lever arm 70 of the second rocker arm assembly 72 through the extended force transferring tip 68. This swings the second rocker arm assembly 72 from the solid line to the dotted line position shown and thereby places the biasing spring 78 in tension. When the second rocker arm assembly changes position as described above, the second one-way actuating linkage 80 slips by the extended lever 90 on the main rocker arm assembly 92. When the second rocker arm assembly 72 reaches the dotted line position shown, the second one-way actuating linkage 80 engages the extended lever 90 on the main rocker arm 92 through the force transferring tip 88 and imparts rotation to the main rocker arm 92 by means of the stored force in the biasing spring 78.

This rotation releases the brake shoe 98 from contact with the flywheel 130 and in moving the main rocker arm 92 from the solid line to the dotted line position shown moves switch actuating arm 100 and spring 106 past the center of moment of the contact make and break arm 104 causing a conventional over center snap action of the arm 104 to close contacts 112 of switch 114 and close the proper signal light circuit.

While the switch contacts are closing, the ratchet wheel is being rotated to slip by pawl 122 to the position shown by the solid line representation of said pawl. The tip 102 of the contact make and break arm 104 is now abutting the stop post 116 and the spring 106 attached between said tip 102 and the switch actuating arm 100 (dotted line position) is in tension. This tension on the spring 106 drives the main driving gear 120 through the switch actuating arm 100, main rocker arm 92, ratchet wheel 118 and pawl 122 in a clockwise direction as shown from the solid line position of the pawl 122 to the dotted line position thereof. When the pawl 122 reached the dotted line position the switch actuating arm has returned past the opposite center of moment of the contact make and break arm 104 and a snap action results to open the contacts 112. As before the time delay between the cocking of the main rocker arm and its return to normal is regulated by the inertia of a gear train and flywheel combination comprising main driving gear 120, gears 124 and 128, shaft 126, gear 132, shaft 134 and flywheel 130.

To summarize, the above described invention provides a device which is much needed in the art in that it is reliable, foolproof and relatively inexpensive to manufacture and install in a motor vehicle.

The timed warning signal that it provides will greatly aid in the prevention of collisions between motor vehicles caused by lack of any indication of deceleration as is now common or lack of sufficient reaction time after seeing a braking signal.

I claim:

1. For use in indicating a condition of a vehicle, a time-controlled switch comprising a body mounted for pivot about a first axis, means actuated by said body to close an electric circuit upon movement of said body in a first rotary direction to a first position and to open such electric circuit upon movement of said body in the opposite rotary direction away from said first position toward a second position, biasing means urging rotation of said body in the opposite rotary direction to open the switch, cocking means adapted to be moved by a linkage of the vehicle to urge occasionally the body in the first rotary direction at least to the first position, flywheel means mounted for rotation about a second axis parallel to said first axis and having considerable inertial mass, means connecting said body and said flywheel means for uniformly proportional rotary movement as said body moves in the said opposite direction, said means connecting having a constant velocity ratio equal to very considerably less than unity, whereby rotation of the body in the said opposite direction causes smooth unidirectional rotation of said flywheel means at an angular velocity much greater than the angular velocity of said body and whereby said flywheel means serves as an inertial governor to control the time elapsing during the rotary movement of the said body in the said opposite direction.

2. A device as described in claim 1 wherein said means connecting said body and said flywheel means includes ratchet means by which said body and said flywheel means are connected for rotation only when said body moves in the said opposite direction.

3. A device as described in claim 1 wherein said means actuated by said body to close and open such electric circuit includes an arm bearing an electric contact and pivoted about a center, and a tension spring having its opposite ends connected to the body and the arm respectively, said spring passing over said center as said body moves from said first to said second position causing said arm to comprise a "snap" action switch.

4. A device as described in claim 1 wherein said body is formed with brake means adapted to engage said flywheel means to stop rotation thereof when said body is in said second position.

5. A device as described in claim 1 wherein said cocking means comprises a pivoted rod having limited pivot and adapted in pivoting in an advance direction from an original position to engage said body and to urge said body to said first position and then as pivoting in the advance direction continues to disengage said body, said rod including a pawl which permits the rod to be pivoted back to said original position without changing position of said body, said rod adapted to be moved in an advance direction by spring means and to be pivoted back by means activated by said linkage.

References Cited in the file of this patent
UNITED STATES PATENTS

| | | |
|---|---|---|
| 832,928 | Spalding | Oct. 9, 1906 |
| 1,672,791 | Thimblethorpe | June 5, 1928 |
| 2,085,218 | Heising | June 29, 1937 |
| 2,552,665 | Cirone | May 15, 1951 |
| 2,562,378 | Darnell | July 31, 1951 |
| 2,574,616 | Brown | Nov. 13, 1951 |
| 2,662,595 | Neumann | Dec. 15, 1953 |